United States Patent [19]

Lott

[11] Patent Number: 4,677,662
[45] Date of Patent: Jun. 30, 1987

[54] MULTIPLE LINE SELF-CONTAINED TELEPHONE

[76] Inventor: Thomas M. Lott, 55 W. Santa Inez Ave., San Mateo, Calif. 94402

[21] Appl. No.: 643,426

[22] Filed: Aug. 23, 1984

[51] Int. Cl.$^4$ .......................................... H04M 19/00
[52] U.S. Cl. .................................. 379/162; 379/164; 379/156
[58] Field of Search ................. 179/81 R, 81 C, 84 L, 179/99 A, 94, 99 H, 99 LS, 170 J, 78 R, 78 A, 80, 70, 77, 40; 363/39

[56] References Cited

U.S. PATENT DOCUMENTS

| 4,004,110 | 1/1977 | Whyte .............................. 179/170 J |
| 4,160,884 | 7/1979 | Bishop ............................. 179/170 J |
| 4,220,827 | 9/1980 | Burke et al. ..................... 179/99 LS |

Primary Examiner—James L. Dwyer

[57] ABSTRACT

A detection circuit is provided for indicating whether a telephone line is in use or is available or is on hold. The simplified circuit can be incorporated within a telephone instrument so that no external circuitry is required.

5 Claims, 3 Drawing Figures

FIG_1.

MULTIPLE LINE SELF-CONTAINED TELEPHONE

SUMMARY OF THE INVENTION

The present invention relates to a novel circuit for detecting whether a telephone is available, is in use or is on hold.

The simplified circuit of the present invention enables one to provide a full feature business-type telephone having multiple lines without the employment of external equipment. Further, the present invention employs CMOS circuitry with a very low power requirement so that battery backup is practical.

Heretofore multiple line telephones have required large complicated external equipment which is ordinarily powered from conventional a.c. lines. Thus, it was necessary to provide a separate equipment rack or closet for the telephone equipment and also most of the telephone features, except for calling out, were lost in case of a power failure.

The use of the external equipment also required that each telephone be provided with a large number of wires. For instance, it is common practice to provide 25 wire pairs going to a four line business telephone. In contrast, the present invention permits a four line phone, including intercom, to operate with 6 wire pairs.

The simple circuit of the present invention permits one to integrate all of the necessary controls within a small self-contained telephone. This reduces the number of lines required and also obviates the need for a separate rack or closet for control equipment. Also, the circuitry of the present invention requires very little power whereby it is entirely practical to employ a battery backup system so that, in case of a mains failure, no service is lost as would be in the case with present equipment wherein one loses all functions except the ability to call out.

Another object of the invention is to provide a plurality of telephone instruments with a multiple d.c. to d.c. power supply with four separate ouputs in each instrument so that a common d.c. supply can be utilized without cross talk between the instruments.

Other features and advantages of the present invention will be brought out in the balance of the application.

DESCRIPTION OF THE PREFERRED EMBODIMENTS

Figure 1:
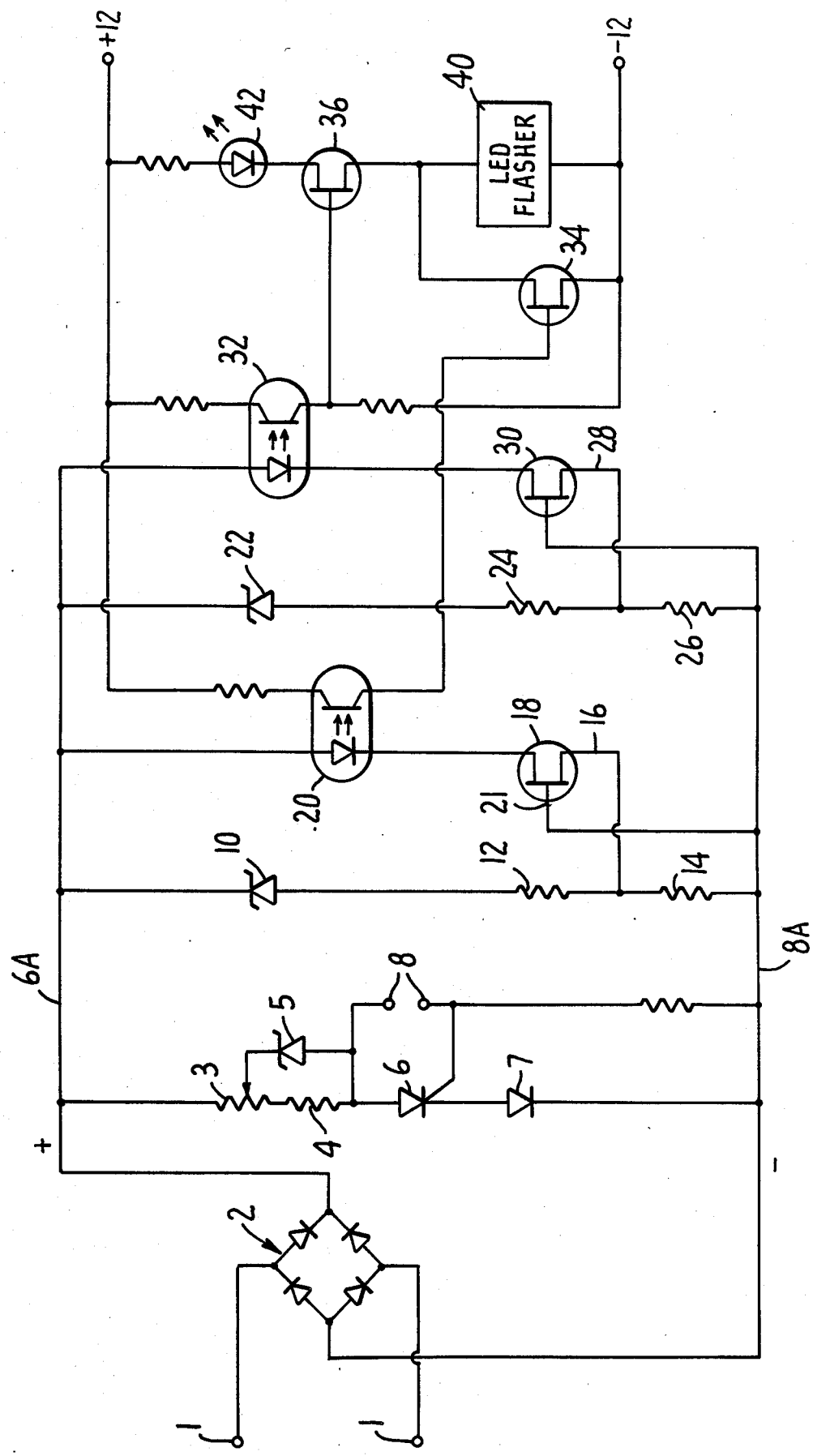
FIG. 1 is a circuit diagram of a simplified form of the present invention suitable for use where a lower resistance can be tolerated across the telephone line.
Figure 2:
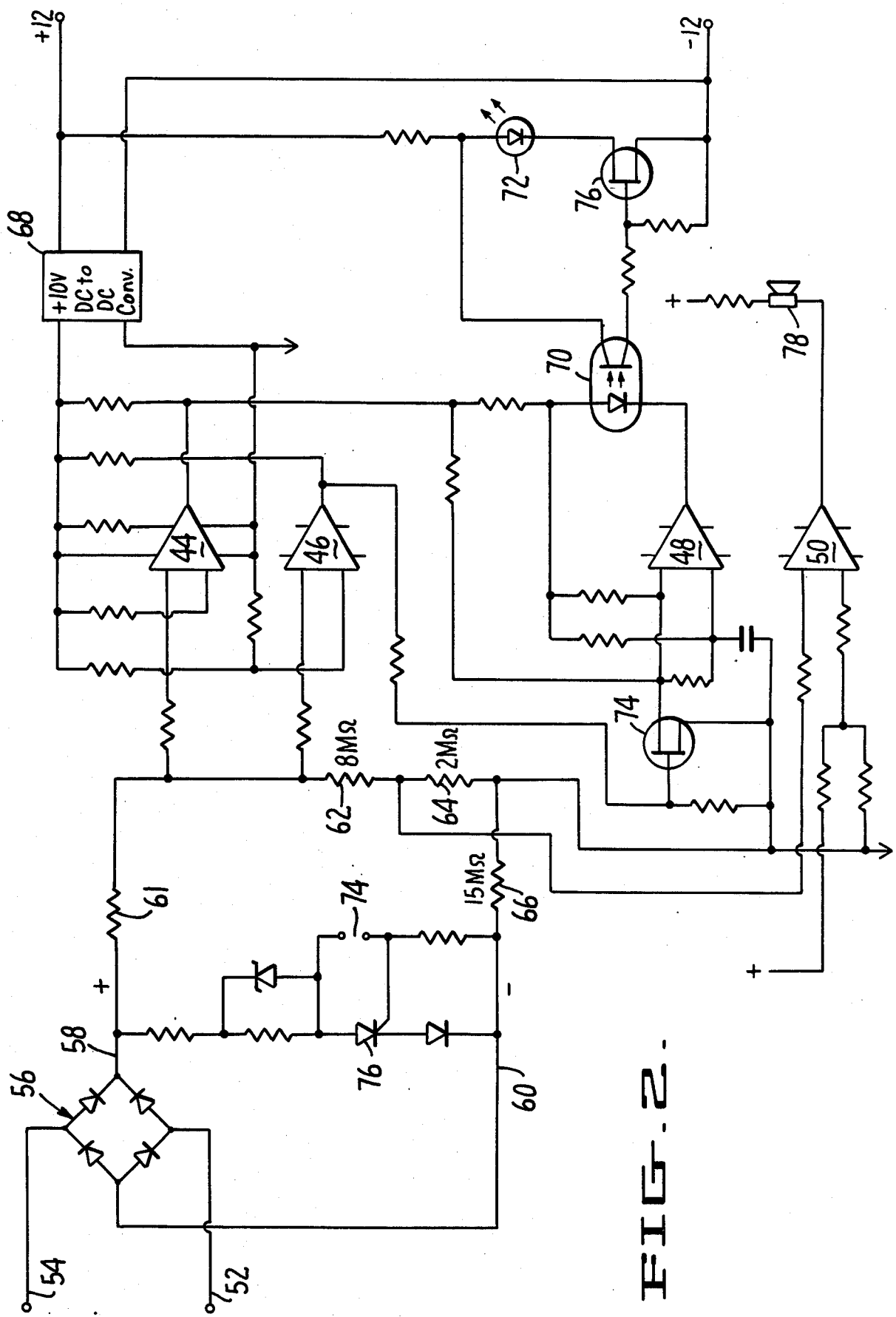
FIG. 2 is a similar circuit which will meet the "on hook" resistance requirement of FCC Rules and Regulations, Part 68 of 10 M$\omega$.

Before describing the workings of FIGS. 1 and 2, it should be understood that when a telephone is on hook about 48 volts will appear across the line. When a telephone is on hold about 18 volts can be made to appear across the line. When the telephone is off hook, i.e. actively in use, from 4 to 9 volts will appear across the line. The circuits of FIGS. 1 and 2 will detect these voltages and give an indication as to whether a line is in use, on hold or available.

Referring now specifically to FIG. 1, an incoming telephone line is indicated at 1. The incoming line 1 goes through a full wave rectifier 2 and the output on lines 6A and 8A goes to a voltage divider which includes resistors 3 and 4 and a zener diode 5, SCR 6 and diode 7. Contacts 8 across SCR 6 go to the hold contacts of a selector switch, described in detail later. A zener diode 10 having a cutoff voltage of 15 volts is in series with a voltage divider made up of resistors 12 and 14. Line 16 from the center of the divider leads to the source of FET 18 while the gate 21 is connected to the negative line 8. FET 18 is of the depletion type which means that it is normally on but that a negative voltage turns the FET off. If the full line voltage is across the lines 6A and 8A, i.e. the phone is on the hook, the gate voltage 21 on FET 18 would be negative with respect to the source 16 so that the FET 18 will be non-conducting. Similarly, the 30 V zener 22 keeps FET 30 turned off. However, if the telephone is placed on hold by shorting contacts 8, this will trigger SCR 6, causing the line voltage to drop to about 18 V and be held there by zener 5 despite variations in line voltage. This will cause FET 18 to conduct, turning on the opto coupler 20. Line 6A also leads to a second zener 22 which has a voltage rating of 30. This is in series with the voltage divider 24 and 26, the center of which is connected to the source 28 of a depletion mode FET 30. The drain of FET 30 is connected to a second opto coupler 32. The gate of 30 is connected to the negative line 8A.

FETs 34 and 36 are of the enhancement mode type which means that they are normally off and a positive voltage turns them on. When the line is on hold, i.e. about 18 volts, the second zener 22 stops conducting which allows FET 30 to turn on which turns on opto coupler 32. This turns on FET 36 which causes LED flasher 40 to go into intermittent operation causing the LED 42 to flash on and off. This indicates to the user that the line is on hold.

Now if one takes the phone off the hook, the voltage across line 6A-8A drops to about 4 to 9 volts which turns both zeners 10 and 22 off which permits the FETs 18 and 30 to turn on. When opto coupler 20 turns on, FET 34 starts conducting which shorts out the LED flasher 40 causing the LED 42 to glow constantly. This indicates to the user that the line is in use. This circuit is completely adequate for private systems and also systems which do not require an extremely high resistance when the phone is on hook.

FIG. 2 shows a more complicated circuit which accomplishes the same result but which has an extremely high resistance ($>$10M$\omega$) so that is meets all FCC requirements and is usable in any country. In this circuit a single quad CMOS comparator or 2 dual CMOS comparators are employed having four sections designated 44, 46, 48 and 50. The incoming line 52 and 54 goes through a full wave rectifier 56 so that it is immaterial which side of the line is positive. Thus, the output from the rectifier will always be positive on line 58 and negative on line 60.

To meet the on hook minimum resistance requirements specified in FCC Rules and Regulations, Part 68 of 10M$\omega$ and to divide the line voltage to a convenient value, a voltage divider network consisting of resistors 61, 62, 64 and 66 is employed. This supplies one-third of the line voltage to sections 44 and 46 of the comparator and one-fifteenth of the voltage to section 50 of the comparator. To prevent the cross talk between lines, which proved a serious problem in previous attempts to build an all electric system, each line condition detector circuit is supplied with its own d.c. to d.c. converter power supply 68 which is run from a common 12 V d.c. supply and which gives a 10 volt well regulated (±1%) output to comparator 44 and by means of resistive voltage dividers, 5 volts to comparator 46 and 6 volts to comparator 50. The d.c. to d.c. converter operates at a frequency of about 60 KHz and so there is no coupling at audio frequencies between the lines. The power supply also supplies the voltage for running the four comparators. Section 48 is used as a hold flashing oscillator operating through opto coupler 70 to actuate LED 72.

Comparator 44 is biased in such a way that it conducts if the voltage in line 58 is less than 30 V. This indicates a hold condition and this actuates comparator 48 through opto coupler 70 causing LED 72 to flash. FETs 74 and 76 are both enhancement mode devices and, when a voltage of less than 15 V is sensed by comparator 46, FET 74 is actuated, shutting off comparator 48 so that LED 72 now stops flashing and has a steady glow, indicating that the phone is off hook and in use.

Comparator 50 compares the plus 10 voltage from the power supply 68 with the voltage developed between resistors 62 and 64 so that this comparator is turned on only when there is a very high voltage on the line, i.e. the ringing current which is in the range of 75–105 volts of 20 cycle a.c. When this voltage appears on the line, the electronic ringer 78 is activated.

Figure 3:
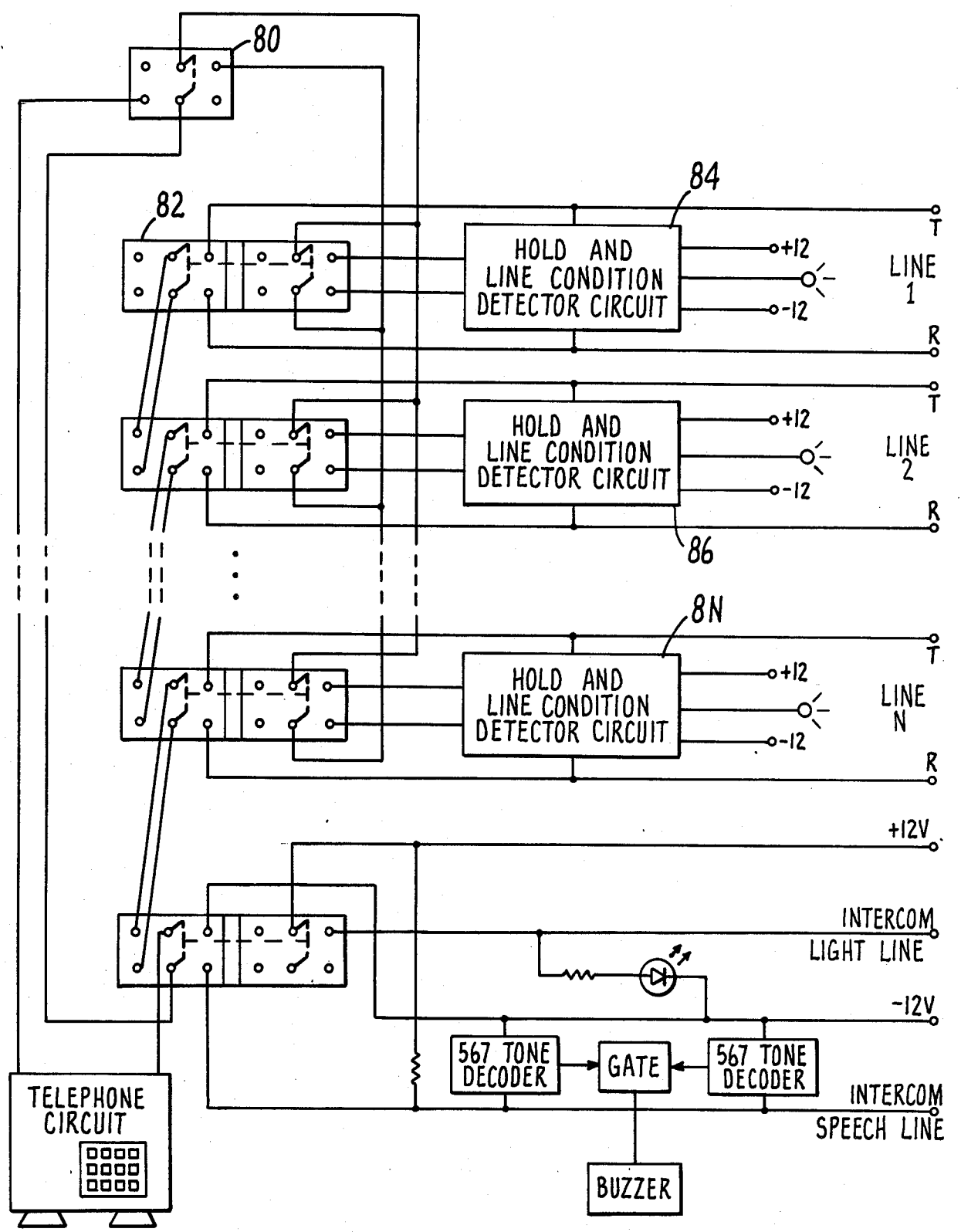
FIG. 3 is a simplified block diagram showing how the line condition indicators of FIGS. 1 or 2 can be incorporated in a telephone keyset.

In FIG. 3 a practical circuit is shown which might be completely contained within a telephone instrument. It will be seen that only three incoming lines are shown, namely, line 1, line 2 and line N but that a large number of lines might be employed. It will also be noted in this circuit that there is a relatively small number of incoming wires, namely, one pair for each line, plus one pair for intercom, plus one pair for the supply voltage.

Switch 80 or hold button is a double pole double throw switch that normally would be in the lefthand position and would be thrown to the right only by pressing the hold button down. Switch 82 and the switches immediately below it are four pole double throw switches and are of a type wherein if one button is depressed, the others are released. Thus, if a call comes in on a particular line, the button for that particular switch is depressed releasing the others. Also, it is possible by activating the switch 80 to place that particular line on hold.

The line condition indicators 84, 86 and 8N can be either of the type indicated in FIG. 1 or FIG. 2. Obviously one complete indicator is employed for each incoming line. Also, an intercom circuit can be employed which is shown in FIG. 3 for the sake of completeness but which is of fairly simple design, using the telephone instrument speech circuits for audio communication and utilizing the touch tone pad buttons to signal the desired office instrument. The DTMF signals are decoded in each instrument by a two stage phase locked loop decoder which can be set by means of a 7 section dip switch to decode any of the 12 pad numbers (0-9 * #).

I claim:

1. In combination, a power supply and a plurality of telephone instruments wherein each of said telephone instruments has a line condition detection circuit for determining and indicating whether a telephone circuit is on hook, on hold or off hook comprising means for determining the voltage across the line and indicating on hook if a high voltage, off hook if a low voltage and on hold if an intermediate voltage and wherein said power supply comprises a d.c. to d.c. converter for each of said telephone instruments operating from a common d.c. power supply at an ultra sonic frequency whereby cross talk between instruments is prevented.

2. The combination of claim 1 employing a light means, said light means glowing steadily to indicate off hook, flashing to indicate on hold and off to indicate on hook.

3. The combination of claim 1 wherein said ultrasonic frequency is about 60 KHz.

4. A power supply for a plurality of telephone instruments comprising a d.c. to d.c. converter for each instrument operating from a common d.c. power supply at an ultra sonic frequency whereby cross talk between instruments is prevented.

5. The power supply of claim 4 wherein the ultrasonic frequency is about 60 KHz.

* * * * *

UNITED STATES PATENT OFFICE
CERTIFICATE OF CORRECTION

Patent No. 4,677,662             Dated   June 30, 1987

Inventor(s)  Thomas M. Lott

It is certified that error appears in the above-identified patent and that said Letters Patent are hereby corrected as shown below:

The symbol "$\omega$" in column 1, line 55 and in column 2, lines 53 and 64 should be -- $\Omega$ --

Signed and Sealed this

Fifth Day of January, 1988

Attest:

DONALD J. QUIGG

Attesting Officer          Commissioner of Patents and Trademarks